United States Patent [19]

Thornton

[11] 3,850,109

[45] Nov. 26, 1974

[54] TRANSPORTATION SYSTEM EMPLOYING MAGNETIC LEVITATION, GUIDANCE AND PROPULSION

[75] Inventor: Richard D. Thornton, Concord, Mass.

[73] Assignee: Massachusetts Institute of Technology, Cambridge, Mass.

[22] Filed: Apr. 30, 1973

[21] Appl. No.: 355,382

[52] U.S. Cl. ............................ 104/148 SS, 318/135

[51] Int. Cl. ............................ B61b 13/08

[58] Field of Search ............ 104/148 MS, 148 LM, 104/148 SS; 308/10; 310/12, 13; 318/135

[56] References Cited

UNITED STATES PATENTS 3,644,762 2/1972 Eastham ..................... 104/148 LM 3,662,689 5/1972 Kawabe et al. ............... 104/148 SS 3,664,268 5/1972 Lucas et al. .................. 104/148 SS

*Primary Examiner*—Lloyd L. King

*Assistant Examiner*—George H. Libman

*Attorney, Agent, or Firm*—Arthur A. Smith, Jr.; Robert Shaw; Martin M. Santa

[57] ABSTRACT

A transportation system wherein a vehicle is magnetically levitated, guided and propelled along a guideway. The vehicle has a number of long thin superconducting coils which, when energized, interact with I-strips in the guideway to effect levitation. Propulsion is accomplished by interaction between further superconducting coils and the field of a linear synchronous motor. In one form, the I-strips are made cryogenic and/or superconducting in and near stations to provide levitation even at very slow speeds and when the vehicle is stationary.

11 Claims, 10 Drawing Figures

PATENTED NOV 26 1974 3,850,109

SHEET 3 OF 3

TRANSPORTATION SYSTEM EMPLOYING MAGNETIC LEVITATION, GUIDANCE AND PROPULSION

The invention described herein was made in the course of or under a contract with the National Science Foundation, an agency of the United States Government. The present invention relates to transportation systems employing magnetic levitation, guidance and propulsion.

The invention is discussed in a journal article (not yet published) by the present inventor entitled "Design Principles for Magnetic Levitation," May, 1973 IEEE Proceedings. Further articles of interest include: "Flying Low with Maglev," R.D. Thornton, IEEE Spectrum, April 1973, pp. 47–54; "Phase-locked Loops for Motor-Speed Control," A.W. Moore, IEEE Spectrum, April 1973, pp. 61–67; "The Linear Synchronous Motor and High Speed Ground Transport," Powell et al. (paper at Energy Conversion Engineering Conference, Boston, Mass., August 3–5, 1971); "Magnetically Levitated Transportation," Guderjahn et al., Cryogenics, June 1971, pp. 171 et seq.; "Magnetic Suspension for Levitated tracked Vehicles," Powell et al., Cryogenics, pp. 192 et seq., June 1971; "Magnetically Suspended Trains: The application of superconductors to high speed transport," Powell et al., Cryogenics and Industrial Gases, pp. 19 et seq., October 1969; and "Magnetic Vehicle R & D Spurred, pp. 47 et seq., Aviation Week & Space Technology, July 10, 1972.

See also the following U.S. Pat. Nos. 3,158,765 (Polgreen); 3,470,828 (Powell, Jr., et al.); 3,611,944 (Reder); 3,622,818 (Payen); 3,624,472 (Graham); 3,513,338 (Poloujadoff); 3,472,176 (Trent); and 3,508,496 (Larson).

Patent application 165,616 filed July 23, 1971, entitled "An Electromagnetically Suspended, Guided, and Propelled Vehicle," (Thornton et al.), now U.S. Lets. Pat. No. 3,768,417, incorporated herein by reference, describes a transportation system hereinafter called the magneplane system. Since the conception of this magneplane system, substantial improvements have been devised to lower the guideway cost and decrease the power dissipated in the suspension and propulsion conductors. See the journal article by the present inventor entitled "Design Principles for Magnetic Levitation".

The fixed cost of the guideway is a dominant cost in the installation of a magneplane system, and a large portion of this is expected to be associated with material and fabrication costs for the electrical conducting material used for levitation strips, propulsion windings, and power transmission and distribution networks. Therefore a prime object of the present invention is to reduce these costs.

Additionally, the wayside power conditioning equipment is a major item of cost, another object of this invention is to show how these costs can be reduced.

It is important for the levitation elements in a magneplane system to provide maximum lift for every watt of electric power dissipated in them. This implies the need for vehicle levitation coils which produce high field strength and an induced guideway field which is much weaker than the vehicle field. The superconducting vehicle coils in the magneplane system can tolerate large current densities, on the order of 10,000 A/cm$^2$, without power dissipation, but calculations indicate that the current densities in the guideway should be on the order of 1000 A/cm$^2$. However, with many existing magnetic levitation (maglev) designs, the guideway current density is higher than this value and is not constrained to flow in a region of high and horizontally directed magnetic field as required for maximum vertical force. Still another object, therefore, is to maximize lift forces in such systems.

In addition to achieving high efficiency, it is important that the suspension system yield relatively low natural frequencies for vehicle motion. It is shown herein that there is a fundamental relation between vehicle natural frequency and guideway efficiency, but by judicious design it is possible to achieve a good compromise. Existing proposals to achieve low power loss (e.g., the Powell Jr., et al. patent) yield a very high natural frequency in addition to posing formidable problems for vehicle switching, and requiring higher vehicle weight and cost. A further object, then, is to teach how low natural frequencies for vehicle motion can be achieved.

A still further object is to provide in a magneplane system, a way to levitate stationary vehicles in and near way side stations.

While the present disclosure is principally directed to improvements in the magneplane system, some features thereof have broader usage; hence, a still further object is to provide improved magnetic levitation, guidance, and propulsion in maglev systems, generally.

These and still further objects are apparent in the description that follows and are particularly delineated in the appended claims.

The foregoing objects are attained, generally, in a transportation system having a vehicle and guideway and wherein the geometry and the orientation of the interacting elements on the vehicle and in the guideway, respectively, are related to maximize interacting desired forces, while minimizing undesired forces and costs thereof. The elements include a plurality of relatively long and thin superconducting coils disposed at each side of the lower half of the vehicle and capable of generating magnetic fields at least of the order of 0.1 to 0.4 Tesla at a distance of ten to twenty-five centimeters from the lower surface of the vehicle. The coils are disposed over a substantial part of the length of the vehicle. The guideway comprises conductive I-strips located to register with the coils at either side of the vehicle. The I-strips each consist of two longitudinal conducting members with conducting links therebetween but with most of the mass of the strips concentrated in the longitudinal members. The orientation angle and the location of the I-strips are chosen to provide, through eddy-current interaction between the magnetic field of the coils and electric currents induced in the strips, both levitation and guidance to the vehicle. Propulsion of the vehicle is provided by a linear synchronous motor that comprises a polyphase winding in the guideway between the I-strips and a further group of superconducting coils in the lower portion of the vehicle and located between said long and thin superconduction coils on one side of the vehicle and similar coils on the other side thereof.

The invention is hereinafter discussed with reference to the accompanying drawing in which.

Figure 1:
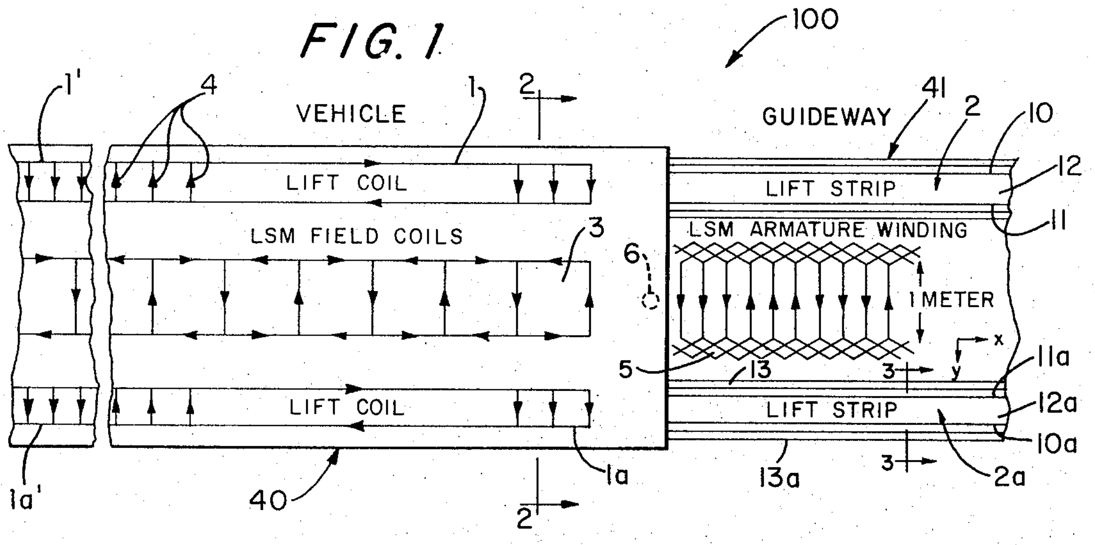
FIG. 1 is a schematic plan view, approximately to scale, of a portion of a magneplane system and shows a part of a vehicle and a part of a guideway for such a system.
Figure 5:
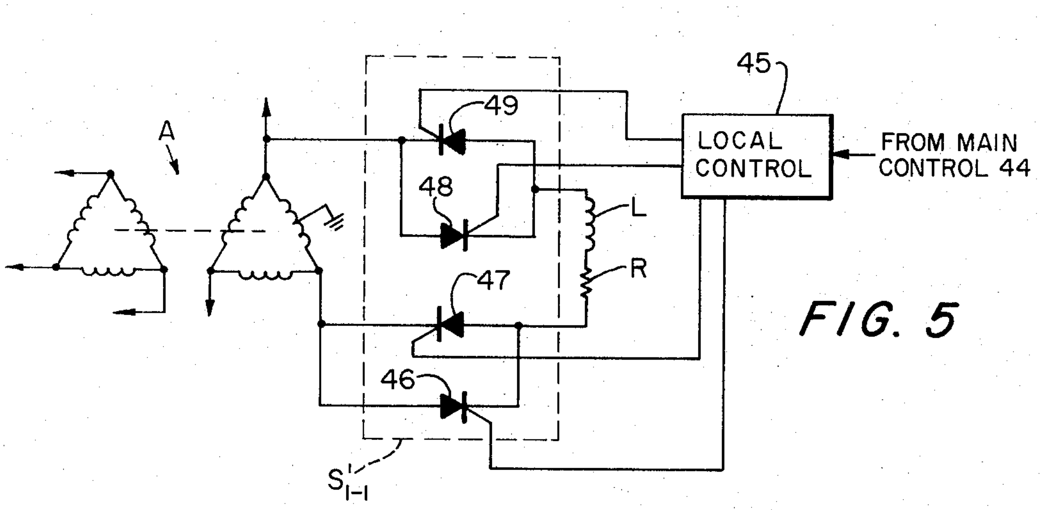
FIG. 5 shows schematically one phase of a polyphase, fixed-frequency, power-conditioning unit.
Figure 6A:
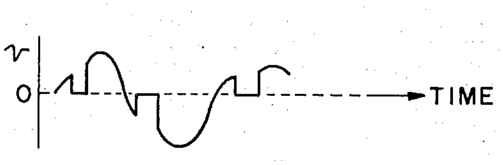
Figure 6B:
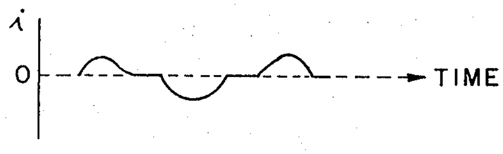
Figure 7A:
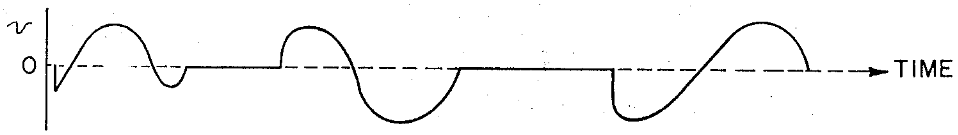
Figure 7B:
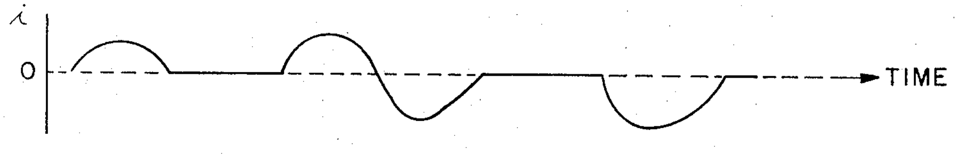
Figure 8:
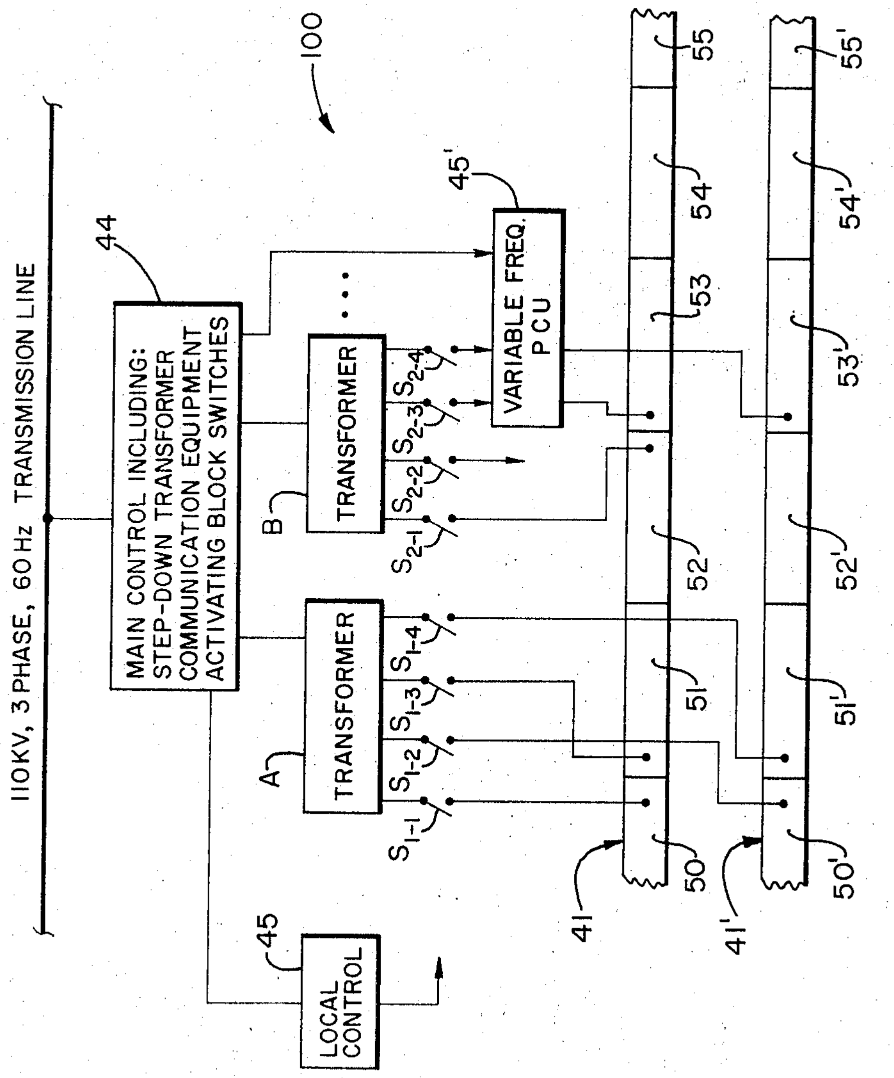

FIGS. 6A and 6B respectively show typical voltage and electric current waveforms that appear as output of the one phase of FIG. 5 for full-speed operation of the magneplane system;

FIGS. 7A and 7B respectively show typical voltage and electric current waveforms for such system when operating at one-third of full speed; and FIG. 8 shows schematically and partly in block diagram form the electrical aspects of a larger portion of the system than is shown in FIG. 1.

Figure 2:
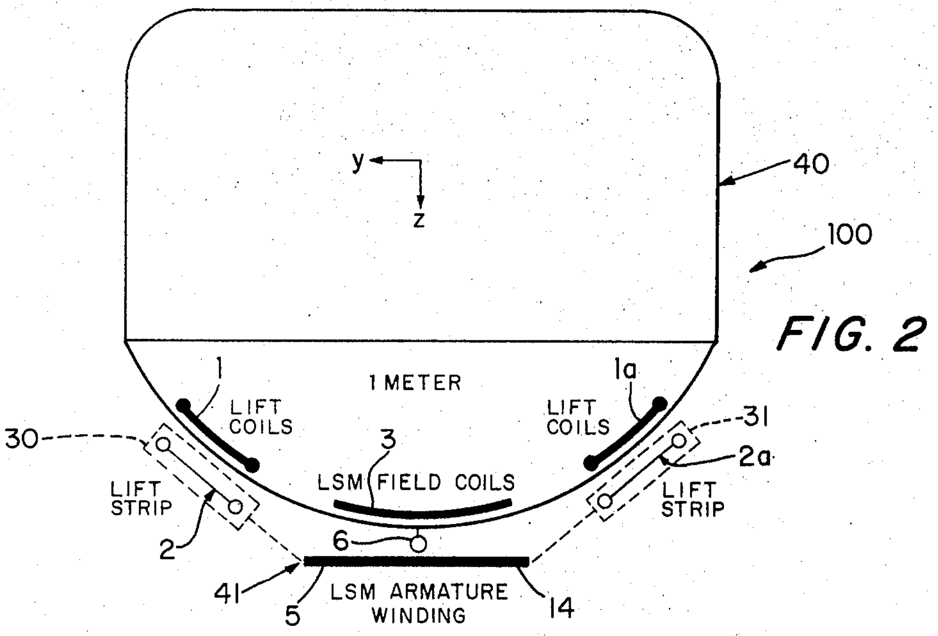
FIG. 2 is a slightly enlarged schematic elevation view, taken upon the line 2—2 in FIG. 1 and looking in the direction of the arrows, the intent being to show in these two Figures the location, geometry, and orientation of the various electromagnetic structural elements on the vehicle and the corresponding interacting elements in the guideway.

There follows now an overall discussion of a transportation system employing magnetic levitation, guidance and propulsion, said system being designated 100 throughout this specification. Referring now to FIGS. 1 and 2, the system 100 is shown comprising a vehicle 40 and a guideway 41. The geometry and the orientation of the interacting elements in the vehicle 40 and in the guideway 41, respectively, are related to maximize desired forces, as later noted, and to minimize undesired forces and costs as also later noted. The vehicle 40 carries a number of relatively long and thin coils 1, 1' . . . and 1*a*, 1*a'* . . . disposed over a substantial part of the vehicle length and on either side of the lower half of the vehicle, as shown. The coils 1, 1' . . . and 1*a*, 1*a'* . . . have distributed end turns, such as, for example, the end turns labeled 4 of the coil 1, to minimize loss. The coils 1 . . . must be capable, when energized, of generating fields at least of the order of 0.1 to 0.4 Tesla at a distance of from 10 to 25 centimeters from the vehicle lower surface.

Figure 4:
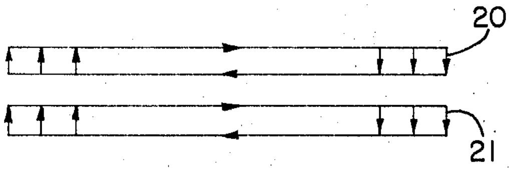
FIG. 4 is a schematic representation of a pair of lift coils which perform the function of the single lift coils shown at each side of the vehicle in FIGS. 1 and 2.

In an operating system, as discussed in said application, the vehicle levitates above the trough-shaped guideway 41. The guideway 41 shown consists of I-strips 2 and 2*a*, the strip 2 being disposed on one side of the guideway 41 and the strip 2*a* being disposed on the other or opposite side thereof to register respectively with the coils 1, 1' . . . and 1*a*, 1*a'* . . . The I-strips 2 and 2*a* consist of two longitudinal conducting members 10, 11 and 10*a*, 11*a*, respectively, with conducting material 12 and 12*a*, respectively, between the longitudinal members but with most of the mass concentrated in the longitudinal members. The orientation angle and the location of the I-strips are chosen to give, through eddy-current interaction with the associated lift coils, both levitation and guidance to the vehicle 40. Propulsion of the vehicle 40 along the guideway 41 is effected by a linear synchronous motor comprising a polyphase linear synchronous motor armature winding 5 disposed in the guideway (and centrally located between the lift strips 2 and 2*a*) and further superconducting coils 3 (also called linear synchronous motor field coils herein) on the vehicle. The linear synchronous motor field coils 3 provide a field about the order of the lift coils and, as shown, are centrally located at the lower half of the vehicle between the lift coils 1, 1' . . . and the lift coils 1*a*, 1*a'* . . . (The arrows in the schematic coil representations of FIG. 1 and later-discussed FIG. 4, represent a possible choice of electriccurrent directions.) A more detailed explanation follows.

Figure 3:
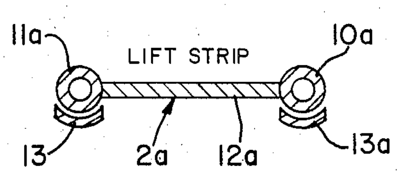
FIG. 3 is a section view, taken on the line 3—3 in FIG. 1 and looking in the direction of the arrows, and shows one of the two lift strips shown in FIG. 1.

One basic aspect of the improved guideway design herein disclosed is to construct th guideway strips with most of the mass concentrated in the solid or hollow longitudinal conductors 10, 11, 10*a* and 11*a* along the edge of the relatively thin sheet of conducting material 12 and 12*a*, respectively; this structure is referred to herein as an I-strip by analogy to an I-beam. The approximate scale drawing in FIG. 1 shows the two I-strips 2, 2*a*, the longitudinal members as shown in FIG. 3, being hollow pipes. For use in the magneplane system, the longitudinal members typically might have an outside diameter of 6 to 10 cm and wall thickness of 1 to 4 cm, while the thickness of the conducting strips 12 and 12*a* typically might be 0.2 to 1 cm. The I-strips can be oriented horizontally and/or vertically, but one attractive embodiment involves tilting the strips at about a 45° angle to the vertical as shown in FIG. 2; the lift coils 1 . . . are similarly tilted as shown.

The conducting strips 12 and 12*a* can be slit transversely to force a desirable current flow, or can be continuous. For mechanical reasons it may be desirable to make them discrete rungs as in a ladder, but with close spacing to achieve the effect of a continuous sheet. Typically the longitudinal sections 10 are round and hollow as shown in FIG. 3 to minimize excess losses associated with skin effects, while maximizing inductive energy storage per unit of power dissipation. Additionally, layers of steel 13 and 13*a* in FIG. 3 can be placed in the vicinity of the longitudinal conductors to increase the energy storage still further.

This I-strip concept is capable of lower material cost and power loss than a continuous strip of uniform thickness. It is easier to fabricate and requires less material than discrete coils. As compared to previously proposed ladder guideways, it minimizes force pulsations and undesirable induced *a- c* fields in the cryogenic vehicle lift coils 1 . . . , 1*A* . . . Furthermore, by proper location of the I-strips and corresponding lift coils, such as shown in FIGS. 1 and 2, it is possible to provide guidance and levitation without the extra cost and power loss of separate vertical guidance strips that have been commonly proposed. A still further advantage of this structure is the ability to achieve substantial mechanical strength from the levitation-guidance strip, and thereby minimize the cost of building elevated guideways.

In order to improve vehicle operation, as above noted, the vehicle field coils 1 . . . , 1*a* . . . herein proposed and shown in FIG. 1 have distributed transverse end turns 4 to reduce transverse current density and thereby provide lower loss in portions 12 and 12*a* of the I-strips. In addition, FIG. 4 shows a modification of the vehicle coil further to minimize induced current in the guideway. Each of the lift coils 1 . . . , 1*a* . . . , may be replaced by the two (or more) coils labeled 20, 21 in FIG. 4. This allows a decrease in the guideway power dissipation with only a modest increase in vehicle natural frequency, but with heavier vehicle coils. The coils 20, 21 produce a higher field gradient than the single coils 1 . . . . In summary, the intent of all the foregoing modifications of the magneplane system disclosed in said application is: first, to place most of the guideway material in a region where the force density JxB is vertical and as large as possible for a given J; second, to increase the magnetic energy storage associated with the induced guideway current without excessive material requirements of power dissipation; third, to achieve a simple structure for the guideway that leads to low fabrication costs, ease of vehicle switching, and minimum effect on the aerodynamic drag of the vehicle; fourth to provide combined levitation and guidance in a single strip on either side of the vehicle, and with each strip producing primarily vertical force on the vehicle; and fifth, to create a vehicle field structure which simplifies the problem of shielding the passengers from excessive fields.

Concurrent with the development of the improved levitation and guidance portion of the magneplane system, it has been possible to reduce the cost of the propulsion system by reducing the pole pitch of the motor to accommodate standard power-line frequencies, and to increase the vehicle thrust per ampere of propulsion current. In the explanation immediately following it is assumed, by way of example, that the design cruise speed of the vehicle is 120 m/s (268 mph) and the available power-line frequency is 60 Hz. Propulsion forces for the vehicle (as is explained in detail in said application) is provided by a linear synchronous motor that comprises the superconducting field coils 3 and the armature 5. If a 1 -meter pole pitch is used for the vehicle field coils 3, then the guideway coils making up the armature 5 can be excited with exactly 60 Hz. Such ideas have been proposed by others, but were deemed impractical without certain new inventions. The major disadvantage of fixed frequency excitation is the problem of maintaining synchronism in the presence of transient disturbances. In convential rotating synchronous machines this problem is solved by having damper windings on the field structure. For the magneplane, however, there is no iron on the vehicle and the current in the armature produces relatively small magnetic fields on the vehicle because of the large spacing between armature (guideway) winding and vehicle; thus damper windings are impractical.

In the magneplane patent application Serial Number 165,616 it is shown how feedback to a wayside power converter could be used to vary the armature current so as to damp out any tendency to drop out of synchronous operation. Additional refinements in a further application Serial Number 259,518 filed June 5, 1972 (Kolm et al. ) show how this feedback can be used to achieve active damping of other undesirable motions of the magneplane, and such active damping is possible with a fixed-frequency excitation as well as variable-frequency excitation. Still further, if the vehicle does drop out of synchronism, it is possible for the system to allow the vehicle to decelerate to a sub-harmonic speed (e.g., 40 m/s, 89 mph for the present example) and then resume propulsion at this lower speed. In the vicinity of every terminal in the system, where vehicles must be able to accelerate and decelerate, there is used more costly variable-frequency, power-conditioning equipment (e.g., cycloconverters). If a vehicle is forced to drop back to a sub-harmonic speed, then the vehicle continues at reduced speed to the first available terminal where it is re-accelerated or stopped.

A larger part of a magneplane system is shown in FIG. 8 which is intended primarily to illustrate the electrical portions of the system. In FIG. 8 two guideways 41 and 41' are shown comprising a series of blocks 50 . . . and 50'. . . respectively. The armature winding 5 in each block is energized by closing an associated three-phase switch $S_{1-1}$, $S_{1-2}$ . . . which, as later discussed, preferably comprise Thyristors. Power to the system comes from a high voltage power line through step down transformers in a main control 44, thence to transformers A, B . . . and through the switches $S_{1-1}$, $S_{1-2}$ to the respective blocks 50 . . . , 50'. . . . For a typical magneplane system there is a substation 44 on the order of every 10 to 30 km with each substation being required to supply power to a maximum of two to four vehicles (or trains) moving in each direction. The substation distributes power at an intermediate voltage to the distribution transformers A, B . . . located between alternate blocks of the guideways. Each of the distribution transformers A,B . . . supplies power to the two nearest blocks for each direction of travel. Most of the control electronics is located at the substation 44. By centralizing the control electronics in the substation 44 it is possible to reduce costs, provide redundancy, and better optimize overall control strategies. An important feature of this approach is that the vehicle can be merged smoothly from one block of excited guideway to another with feedback control used gradually to de-energize one block as the vehicle moves out of the block, and energize the next block as the vehicle moves into it.

The switches $S_{1-1}$ . . . are preferably thyristor as shown in FIG. 5 which illustrates one phase $S'_{1-1}$ of a three phase switch. The one-phase switch $S'_{1-1}$comprises thyristor pairs 46, 47, and 48, 49 which are controlled by a local control 45. It is not believed that anything further need be said about the control 45 since the ON-OFF control of thyristors is well-known. Firing time is controlled by a voltage signal from the main control 44. The techniques for control theory are well developed. (See, for example "Optimal Control and Introduction to the Theory and Its Applications," McGraw-Hill Publishing Company 1966 by Athans and Falb. See also the discussion of phase-locked loops in the Moore article above-referenced.) In order to effect control, however, it is necessary to have a communication link between the vehicle and the main control 44. This link can be a radio link, but it can also utilize the guideway as part of a transmission line in a way somewhat similar to that used for railroad signaling or electrification. Typically the vehicle couples a signal into the guideway by inductive, capacitive, or conductive means, and this signal is transmitted down the guideway. A further discussion of the electrical system is discussed in the next few paragraphs.

The pairs of thyristors, 46, 47 and 48, 49 are used to excite each winding of the multi-phase armature 5 represented by the inductance marked L and the resistor marked R. All thyristors are fired at the same time. The center-tapped transformer A and series connection of the thyristors are used to provide higher voltage capability. (Additional series and parallel connected thyristors may also be required.) The current of the armature winding is somewhat non-sinusoidal, but the 60 Hz component which is primarily responsible for the thrust is controlled by the time of firing of the thyristors. Typical waveforms are shown in FIGS. 6A and 6B. An electromagnetic sensor 6 on the vehicle measures the relative displacement between the vehicle field and the travelling field in the guideway, and sends this information back to the power controller 44, preferably using the guideway as a transmission line for transmitting this signal, as above noted. Logic circuitry at the wayside causes the phasing of the armature current to vary so as to maintain the desired vehicle displacement. For a typical design, operation should be maintained near a position of 90 ° displacement between vehicle field and the guideway field so as to maintain maximum vehicle thrust per ampere of armature current (i.e., maximum electrical efficiency). It may even be desirable to operate with a displacement which exceeds 90° so as to make the motor have a leading power angle (i.e., so the vehicle presents a load impedance which is capacitive).

For sub-synchronous operation the control logic causes certain firing pulses to be obmitted. For example, if the base speed is 120 m/s, then for operation at 40 m/s every third pulse is omitted, as shown in FIGS. 7A and 7B. The result is a wave with reduced voltage and 20 Hz electrical frequency, exactly as required. Other sub-synchronous speeds are possible, and, if necessary, the power conditioning equipment can operate with an almost continuous frequency range below about 20Hz. Fewer thyristors are possible with this design than with a cycloconverter because the low frequency operation does not require full power. For example, with three-phase excitation and motor winding, the number of thyristors is reduced by a factor of three and a misfiring will never cause a short circuit across the power line. Other variations of this design are possible, such as using tapped transformers with either electrical or mechanical tap changing, to provide a more sinusoidal load current.

An additional advantage of using higher frequency current and shorter pole pitch in the field winding 5 is a reduced shielding problem. The passengers must be shielded from excess magnetic fields produced by the vehicle motor field winding, a shorter pole pitch makes this simpler. Additionally, the shorter the pole pitch means that fewer phases are necessary to provide smooth thrust, particularly at low speeds.

In this and the next paragraph there is discussed a guideway that allows low speed operation in and near terminals for an inductive maglev system. With conventional designs the power required for levitation is nearly constant at moderate speeds, so the magnetic drag force increases with decreasing speed. At a relatively low speed, on the order of 5 to 20 meters per second (11 to 45 mph), the drag reaches a peak, and below this speed the induced currents decrease and the vehicle gradually loses its levitation force. Thus it is necessary to provide wheels or other low speed suspension facilities, as described in said application Serial Number 165,616. In addition to a complete loss of levitation at very low speeds, the drag peak may be so large that a vehicle starting from rest has difficulty achieving enough thrust to ever accelerate through this peak; so special mechanisms must be used to support the vehicle up to speeds greater than that at which the drag is maximum.

The present invention employs a superconducting guideway and/or a cryogenic guideway to provide lift down to arbitrarily low speeds. For a transportation system, typical vehicle acceleration and deceleration rates are 1 to 2 $m/s^2$, so the drag peak is reached in about 50 to 150 meters after acceleration starts or before the vehicle comes to rest. Hence, it is practical to use a superconducting or cryogenic guideway in and near a terminal in order to avoid the use of wheels. If it is assumed, for example, that 50 meters of superconducting guideway in and near the terminal is cooled to liquid helium temperatures and the next 200 meters is a cryogenically cooled guideway, the vehicle would remain stably at rest on the superconducting guideway for loading and unloading, and would then be accelerated by the linear motor. At the time the vehicle reaches the cryogenic guideway, it has sufficient speed to remain levitated with low drag. By the end of the cryogenic guideway the vehicle has reached sufficient speed to be stably levitated by a normal aluminum guideway. In fact, a cryogenic or superconducting temperature is needed only for the I-strips 2 and **2*a* (or other levitation conductor configurations), and this condition can be provided by dewars 30 and 31, respectively, in FIG. 2. For present purposes, it is assumed that the blocks 53 and 53′ represent the terminal area which has superconducting I-strips and the further I-strips that are cryogenic, and that the blocks 53 and 53′ (and further adjacent block) are powered by variable-frequency power conditioning units 45′** which can be cycloconverters as discussed in application Serial Number 165,616 with means for converting the 60Hz input thereto to some higher frequency. The cryogenic and superconducting levitation schemes just discussed can be augmented by an active system using electric feedback to coils in the guideway, which coils generate appropriate magnetic fields to give stable levitation to vehicles in the near terminals.

For emergency stopping at any point on the guideway it is practical to use teflon skids or an inflatable support which will transmit the vehicle weight to the longitudinal members of the I-strips. Even assuming loss of propulsion power and loss of current in one of the vehicle lift coils, the vehicle can stay stably levitated down to sufficiently low speeds that replaceable mechanical skids can provide reliable suspension and distribute the vehicle weight over a substantial length of guideway. Such emergency stopping would be sufficiently rare to justify an inexpensive suspension system. It has been shown that the basic design allows the vehicle to progress at relative low speeds at reduced power level; so relatively low powered emergency power supplies are normally adequate for propelling a vehicle to a nearby terminal where complete acceleration and deceleration are possible. The inertia of a rapidly moving vehicle is sufficient to maintain levitation through power failures on the order of two minutes, and this is sufficient time for emergency action to be taken.

The preceding description explains how the new developments in guideway and motor design can be used to decrease capital cost, improve efficiency, and give safe, reliable operation of the magneplane. In addition, many of these ideas can be used separately for similar maglev systems, and even for the attractive, ferromagnetic systems.

Further modifications of the invention herein disclosed will occur to persons skilled in the art and all such modifications are deemed to be within the spirit and scope of the invention as defined by the appended claims.

What is claimed is:

1. A transportation system employing magnetic levitation having, in combination, a vehicle carrying a number of relatively long and thin superconducting coils capable, when energized, of generating fields at least of the order of 0.1 to 0.4 Tesla at a distance of 10 to 25 centimeters from the vehicle lower surface, said coils being disposed over a substantial length of the vehicle on either side of the lower half of the vehicle and having distributed end turns to minimize loss, a guideway comprising I-strips on either side thereof, said strips being spaced on the order of one-third to one times the vehicle width and located substantially under the corresponding superconducting vehicle coils, said I-strips comprising two longitudinal conducting members with conducting material between the longitudinal members but with most of the mass concentrated in the longitudinal members, the orientation angle and the location of the I-strips being such as to provide both levitation and guidance to the vehicle.

2. A transportation system as claimed in claim 1 in which steel strips are mounted in proximity to the I-strips in order to provide increased levitation force per watt of power dissipation.

3. A transportation system as claimed in claim 1 in which a linear synchronous motor winding is disposed between the I-strips and is excited from wayside power conditioning units and in which the vehicle contains further superconducting coils near said lower surface and located between the long and thin superconducting coils.

4. A transportation system as in claim 3 in which the guideway comprises a series of blocks and in which adjacent blocks of guideway are excited by alternate power conditioning units so as to achieve smooth transition of the vehicle from one block to another.

5. A transportation system as claimed in claim 3 in which the power conditioning units normally provide power at the available power system frequency, in which the amplitude of the guideway excitation is controlled in response to feedback from the vehicle, the power conditioning units being so designed as to allow lower speed operation at a sub-harmonic of the power system frequency, and in which variable frequency power converters are located at suitable intervals along the guideway and are used to provide complete acceleration and deceleration capability.

6. A transportation system as claimed in claim 3 in which the I-strips are cryogenic or superconducting guideway in the vicinity of terminals to provide low speed levitation.

7. A transportation system as claimed in claim 1 in which the I-strips are cryogenic or superconducting guideway in the vicinity of terminals to provide low speed levitation.

8. A transportation system comprising, in combination, a vehicle which is magnetically levitated by repulsion or attraction from a strip or rail on either side of the vehicle, an armature winding disposed in a guideway between the two lift strips or rails, a series of conducting coils disposed over substantially the entire length of the vehicle above the armature winding, said coils being capable of being excited to produce the effect of alternating north and south poles underneath the vehicle, said armature winding being excited from wayside power conditioning units and normally producing a controllable power at substantially the same frequency as the power system input frequency, said power conditioning units being so designed as to make available sub-synchronous power for occasional lower speed operation, and additional variable frequency power converters located at suitable intervals along the guideway to provide complete acceleration and deceleration capability.

9. A transportation system employing magnetic levitation having, in combination, a vehicle carrying a number of relatively long and thin superconducting coils capable, when energized, of generating fields at least of the order of 0.1 to 0.4 Tesla at a distance of 10 to 25 centimeters from the vehicle lower surface, said coils being over a substantial length of the vehicle on either side of the lower portion of the vehicle and with distributed end turns to minimize loss, a guideway comprising I-strips at each side of the guideway, said strips being spaced on the order of one-third to one times the vehicle width and being located substantially to register with corresponding superconducting vehicle coils, said I-strips comprising two longitudinal conducting members with conducting material between the longitudinal members but with most of the mass concentrated in the longitudinal members, the orientation angle and the location of the I-strips being such as to provide both levitation and guidance to the vehicle.

10. Apparatus as claimed in claim 9 in which each of the superconducting coils comprises a plurality of coils which together act to provide the 0.1 to 0.4 Tesla fields and which produce, as well, higher field gradient than a single coil.

11. Apparatus as claimed in claim 9 in which the superconducting coils have distributed end turns to minimize loss.

* * * * *